United States Patent [19]

Bobrich et al.

[11] Patent Number: 5,330,784
[45] Date of Patent: Jul. 19, 1994

[54] PROCESS OF PRODUCING A FLEXIBLE MAGNETIC RECORDING MEDIA HAVING A BACKING COATING

[75] Inventors: Michael Bobrich, Boehl-Iggelheim; Gregor Brodt, Heppenheim; Hermann Roller, Ludwigshafen, all of Fed. Rep. of Germany

[73] Assignee: BASF Magnetics GmbH, Mannheim, Fed. Rep. of Germany

[21] Appl. No.: 145,599

[22] Filed: Nov. 4, 1993

[30] Foreign Application Priority Data

Nov. 12, 1992 [DE] Fed. Rep. of Germany ....... 4238174

[51] Int. Cl.$^5$ .............................................. B05D 5/12
[52] U.S. Cl. ................................... 427/131; 427/128; 427/209
[58] Field of Search ........................ 427/128, 131, 209

[56] References Cited

U.S. PATENT DOCUMENTS

| 3,293,066 | 12/1966 | Haines | 117/68 |
| 4,135,031 | 1/1979 | Akashi et al. | 428/323 |
| 4,735,352 | 4/1988 | Remmers | 211/107 |

FOREIGN PATENT DOCUMENTS 4128816 3/1992 Fed. Rep. of Germany.
1197661 7/1970 United Kingdom.

OTHER PUBLICATIONS

Patent Abst. of Japan, vol. 11, No. 256 (P-607) Nov. 20, 1987 (JP62062422).

Primary Examiner—Bernard Pianalto
Attorney, Agent, or Firm—Keil & Weinkauf

[57] ABSTRACT

Flexible magnetic recording media essentially consist of a web-like nonmagnetic substrate, a magnetic layer applied to one main side of the web-like substrate and a backing coating formed on the opposite main side of the substrate from a polymeric binder and nonmagnetizable fillers and supporting pigments.

5 Claims, No Drawings

PROCESS OF PRODUCING A FLEXIBLE MAGNETIC RECORDING MEDIA HAVING A BACKING COATING

The present invention relates to flexible magnetic recording media, essentially consisting of a web-like nonmagnetic substrate, especially in film form, a magnetic layer applied to one main side of the substrate and a backing coating formed on the opposite main side of the substrate from a polymeric binder and nonmagnetic fillers and supporting pigments.

It is known that flexible magnetic recording media can be provided with backing coatings containing nonmagnetizable, nonconductive and/or conductive substances.

U.S. Pat. No. 3,293,066 states that electrostatic charge build-ups on magnetic tapes, which may form in recorders at high tape speeds, can be eliminated by applying conductive backing coatings and furthermore the backs of the tapes can be made more hard-wearing by means of backing coatings. Furthermore, GB-A 1 197 661 and U.S. Pat. No. 4,135,031 disclose that the winding properties of magnetic tapes can be improved by applying backing coatings having predetermined surface roughness. Such backing coatings are also known for magnetic cards. EP-A 101 020 discloses specific binder mixtures which, particularly with the addition of carbon black, give backing coatings having excellent adhesive strengths, wear resistance and stability under conditions of high temperature and humidity.

Such backing coatings are particularly important in the case of video tapes, especially those for the home video sector. Thus, for improving the scratch resistance and reducing the number of errors, U.S. Pat. No. 4,735,325 proposes, inter alia, a backing coating which consists of carbon black having different particle sizes and of fillers having a Mohs' hardness of $\geq 8$, dispersed in a polymeric binder. In addition to an improvement in the wear resistance and a reduction of the abrasiveness, the proposed backing coatings also serve to reduce the light transmittance of the tape material, which is required in particular when such tapes are used in commercial video recorders. For this purpose, EP-A 105 471 proposes a backing coating based on barium sulfate/$\alpha$-iron(III) oxide with or without particular carbon black additives.

DE-A 41 17 980 provides transparent backing coatings for magnetic recording media, which both meet the requirements with regard to the mechanical properties, such as wear resistance and abrasiveness, and also have sufficient light transmittance, so that a corresponding magnetic recording medium can also be used for the thermo-duplication method.

DE-A 42 16 847 relates to the stabilization of backing coating dispersions by means of phosphate-containing polyurethanes, said dispersions being prepared in high-speed stirred ball mills. However, such binders are moisture sensitive owing to their polarity. This may be reflected, for example, in an increase in the number of errors of the tapes during storage under conditions of high temperature and humidity. The situation can be improved by admixing other conventional polymers. Nevertheless, the situation in general is unsatisfactory. The use of $SiO_2$ and $Al_2O_3$ products treated with trialkoxysilanes and hence rendered water-repellent also fails to produce any significant improvements.

It is an object of the present invention to provide a backing coating which has improved behavior under conditions of high temperature and humidity, the stability of the dispersion during the preparation process being unchanged.

We have found, surprisingly, that this object is achieved if, in addition to conventional polymers, the binder matrix of the backing coating contains a polyurethaneurea (meth)acrylate which is obtained by reacting a poly(meth)acrylate having up to 2 terminal OH groups per mol and a molecular weight of from 200 to 50,000 with a mixture of aliphatic polyisocyanates having an average functionality of from 3.0 to 6 NCO groups per mol, consisting of from 0.1 to 10% by weight of a diisocyanate,
from 20 to 80% by weight of a triisocyanate and
from 20 to 60% by weight of an isocyanate having a functionality of from 4 to 10, with the proviso that from 1.2 to 3.0 NCO groups react per OH group and the remaining OH groups are converted into substituted urea groups with aminoalkyltrialkoxysilanes.

In a preferred embodiment of the novel magnetic recording media, the polyurethaneurea (meth)acrylate present in the binder mixture of the backing coating is obtained by reacting a polyacrylate having up to 2 terminal OH groups per mol and a molecular weight of, in particular, from 400 to 4,000 with the stated mixture of aliphatic polyisocyanates having an average functionality of from 3.5 to 5.5 NCO groups per mol, with the proviso that from 1.5 to 2.5 NCO groups react of OH group. A mixture which is composed of from 0.3 to 8% by weight of a diisocyanate,
from 30 to 70% by weight of a triisocyanate and
from 20 to 50% by weight of an isocyanate having a functionality of from 4 to 10 is particularly suitable for this purpose.

The polymethacrylate used for the preparation of the polyurethaneurea (meth)acrylate is an esterification product of (meth)acrylic acid and an alcohol component having a $C_1$–$C_{25}$-alkyl radical and from 0 to 2.5% of a hydroxyalkyl (meth)acrylate having a $C_1$–$C_{25}$-alkyl radical. Examples of suitable alkyl radicals are methyl, ethyl, propyl, butyl, isopropyl, tert-butyl, pentyl, nonyl and stearyl. Suitable hydroxyalkyl (meth)acrylates include ethanediol monoacrylate and propanediol monoacrylate.

It is also advantageous in the polymerization to introduce the OH groups at the chain ends by means of OH-containing polymerization initiators, for example hydroperoxides, or OH-containing regulators, such as mercaptoethanol.

For the preparation of the polymethacrylate, it is also possible to incorporate other known vinyl monomers, for example vinylbenzene, vinyl chloride, vinyl acetate, vinyl propionate, acrylamide or acrylonitrile.

Suitable isocyanates and reaction products thereof include aliphatic isocyanates and their reaction products in the form of relatively high molecular weight polyisocyanates, as are formed by an addition reaction of di-, tri- and possibly polyols with aliphatic diisocyanates or by biuret formation or cyanurate formation. Suitable aliphatic diisocyanates for this purpose are, for example, hexamethylene diisocyanate or isophorone diisocyanate.

The polyurethaneurea (meth)acrylates to be used according to this invention and composed of the building blocks described should have a broad molecular weight distribution for good dispersing behavior and high dispersion stability. The molecular weight is from 200 to 50,000, preferably from 500 to 40,000 (measured by GPC), with a weight average molecular weight of from 1,000 to 10,000, in particular from 2,000 to 8,000, preferably from 4,000 to 7,000.

The polyurethaneurea (meth)acrylate to be used according to this invention advantageously has a pendulum hardness (according to DIN 53,157) of from 20 to 130 s and a modulus of elasticity (according to DIN 53,457) of from 500 to 2,500 N/mm$^2$, an elongation at break of more than 70% (DIN 53,455) and a tensile strength of from 25 to 70 N/mm$^2$ (DIN 53,455). A pendulum hardness of from 25 to 125 s, a modulus of elasticity of from 600 to 2,000, an elongation at break of from 80 to 500% and a tensile strength of from 25 to 50 N/mm$^2$ are particularly advantageous.

The polyurethaneurea (meth)acrylate present in the backing coating of the novel recording media is not used alone but, in order to achieve optimum properties, is mixed with further conventional binders. The amount of the polyurethaneurea (meth)acrylate in the binder matrix is from 5 to 55, preferably from 10 to 30, % by weight. The polymers present in the binder mixture are in general polyvinyl formals, polyurethane elastomers, mixtures of polyisocyanates and relatively high molecular weight polyhydroxy compounds, nitrocelluloses, linear saturated polyester resins of terephthalate or isophthalic acid and ethylene glycol, vinyl chloride polymers having more than 60% of vinyl chloride building blocks, vinyl chloride copolymers with one or more unsaturated carboxylic acids of 2 to 5 carbon atoms as comohomers or hydroxyl-containing vinyl chloride copolymers which can be prepared by partial hydrolysis of vinyl chloride/vinyl ester copolymers or direct copolymerization of vinyl chloride with hydroxyl-containing monomers, such as allyl alcohol or 4-hydroxybutyl or 2-hydroxyethyl (meth)acrylate, said polymers being soluble in conventional solvents. Mixtures of one or more polyurethane elastomers with polyvinyl formals, phenoxy resins, linear saturated polyester resins and vinyl chloride copolymers having the composition stated above are also suitable as binders. Particularly preferred organic polymers are mixtures of polyurethane elastomers with phenoxy resins, polyurethane elastomers with polyvinyl formals, polyesterurethanes with vinyl chloride polymers or linear polyester resins and low molecular weight OH-containing polyureaurethanes.

Cyclic ethers, such as tetrahydrofuran and dioxane, and ketones, such as methyl ethyl ketone or cyclohexanone, are used as solvents for the preparation and processing of the polymers. The polymers can, of course, also be dissolved in other strongly polar solvents, such as dimethylformamide, pyrrolidone, dimethyl sulfoxide or ethylglycol acetate. It is also possible to mix the stated solvents with aromatics, such as toluene or xylene, and esters, such as ethyl or butyl acetate.

Suitable fillers and pigments are also known products, such as silica, in the form of pyrogenic or precipitated silica, calcium carbonate and barium sulfate having a mean agglomerate size of from 0.05 to 4 μm. Suitable supporting pigments are pariculate compounds selected from the group consisting of alumina, α-iron (III) oxide, titanium dioxide, zinc ferrite and/or chrome green having a mean agglomerate size of from 0.1 to 0.5 μm. Both spherical polyolefin and carbon black may be present, in a pigment volume concentration of up to 30%.

However, a mixture of silica with zinc ferrite, silica with $Al_2O_3$, silica with zinc ferrite and small amounts of a conductive furance black and $Al_2O_3$ alone are preferably used.

For dispersing, the components are processed together with the dissolved organic polymers alone or with conventional dispersants, such as soybean lecithin, saturated and unsaturated, straight-chain and branched fatty acids, etc. Preferably, no dispersant or only a small amount of dispersant is used. To improve the frictional properties, conventional lubricants, such as fatty esters, silicone oils or fluorine-based additives, may be added.

The dispersing is carried out in vertical or horizontal strirred ball mills. The backing coating is preferably applied using the engraved roller method. To evaporate the solvents and dry or cure the backing coating, the latter is passed through a heat tunnel. It is possible to apply the magnetic dispersion and backing coating dispersion in one operation or in succession. The coated films can, if necessary, also be calendered and compacted on conventional apparatuses by being passed between heated and polished rollers, if required with the use of pressure. The thickness of the backing coating is less than 5.5 μm, in particular less than 2.5 μm, preferably from 0.2 to 1 μm.

In an advantageous embodiment of the novel magnetic recording media, the backing coating is composed of from 2.5 to 25, in particular from 5 to 20, % by weight of a polyurethaneurea (meth)acrylate, obtained from an OH-containing acrylate having an average molecular weight of 5,000 and a biuret polyisocyanate having an average functionality of 3.8, consisting of 0.5% of diisocyanate, 60% of triisocyanate, the remainder being polyisocyanate having an average functionality of 4.8, and the remaining NCO groups at the chain end being converted into substituted areas by aminoalkylenetrialkoxysilanes, from 5 to 30, preferably from 10 to 20, % by weight of a linear polyesterurethane obtained from adipic acid, 1,4-butanediol and 4,4-diisocyanatodiphenylmethane, from 5 to 30, preferably from 15 to 30, % by weight of a polyphenoxy resin obtained from hisphenol A and epichlorohydrin, from 5 to 25, in particular 10 to 20, % by weight of a polyisocyanate resin, from 15 to 60, preferably from 20 to 40, % by weight of a precipitated silica having an $SiO_2$ content of from 98 to 99.5%, a pH of from 5 to 7 and a density of 1.9 g/cm$^3$, from 4.5 to 15, in particular from 6 to 12, % by weight of a cubic zinc ferrite having a mean particle size of from 0.1 to 5 μm, of a spherical α-Fe203 or of an A1203 and from 1 to 5, preferably from 1.5 to 3, % by weight of a spherical LD polyolefin. In addition to the amounts of not more than 0.5% by weight of a known dispersant and of a lubricant, it may be advantageous to replace part of the fillers or supporting substances with carbon black.

Compared with the prior art magnetic recording media, the novel ones have higher heat stability and moisture resistance, owing to the anchoring of the claimed polyurethaneurea (meth)acrylate to the pigment surfaces. Moreover, the backing coatings of the novel magnetic recording media are transparent to IR radiation in the, wave length of from 0.5 to 1.8 μm.

The Examples which follow illustrate the invention and compare it with prior art experiments. In the Examples and Comparative Experiments which follow, parts and percentages are by weight, unless stated otherwise.

EXAMPLE A 17,482 parts of tetrahydrofuran are heated to the boil in a heatable reaction vessel having a capacity of 100,000 parts by volume and equipped with a stirrer and a reflux condenser. A mixture of 15,903 parts of methyl methacrylate, 15,903 parts of n-butyl methacrylate, 403 parts of mercaptoethanol and 80 parts of azobisisobutyronitrile is metered in over 2 hours. Stirring is carried out for 30 minutes, after which a mixture of 132 parts of azobisisobutyronitrile and 257 parts of mercaptoethanol, dissolved in 1,532 parts of tetrahydrofuran, is added in the course of a further 2 hours. After 2 hours, a mixture of 3,384 parts of tetrahydrofuran, 24 parts of hexamethylene diisocyanate, 2,909 parts of a biuret of hexamethylene diisoayanate and 1,430 parts of polyisocyanate having an average functionality of 4.8 is added in the course of 15 minutes. Stirring is carried out for 30 minutes, after which 200 parts of dibutyl tin dilaurate are added to 1,000,000 parts of the total amount. After 1 hour, 2,572 parts of 3-trimethoxysilylpropylamine and 15,079 parts of tetrahydrofuran are added. The K value of the polymer is about 20, measured in 1% strength solution in dimethylformamide.

EXAMPLE 1

12,500 parts of zirconiumdioxide balls having a diameter of from 1.0 to 1.25 mm, 50 parts of a 50% strength solution of the polyurethaneurea (meth)acrylate, prepared according to Example A, 86 parts of a 20% strength solution of a polyphenoxy resin, obtained from bisphenol A and epichlorohydrin and having 6% by weight of hydroxyl groups, in a mixture of equal amounts of tetrahydrofuran and dioxane, 109 parts of a 13% strength solution of a linear polyesterurethane, prepared from adipic acid, 1,4-butanediol and 4,4-diisocyanatodiphenylmethane, in a mixture of equal amounts of tetrahydrofuran and dioxane, 0.85 part of an isomeric $C_{18}$-carboxylic acid, 734.4 parts of a mixture of equal amounts of tetrahydrofuran and dioxane, 136 parts of a precipitated silica having an average agglomerate size of 3 $\mu$m, 34 parts of a cubic zinc ferrite having a mean particle size of from 0.12 $\mu$m and 8.5 parts of a polyolefin having an average molecular weight of 3,000 and a mean spherical particle diameter of 500 $\mu$m were introduced into a batchwise stirred ball mill having a volume of 10,000 parts. The stirred ball mill was then closed and the content was dispersed for 6 hours. In order to check the progress of dispersing, the mill was opened again and a sample taken. When this sample was satisfactory, a further 350 parts of a 20% strength solution of polyphenoxy resin, 443 parts of the 13% strength solution of the linear polyesterurethane, 10 parts of a 10% strength solution of dibutyltin dilaurate in a mixture of equal amounts of tetrahydrofuran and dioxane, 4 parts of a 10% strength solution of a fluorine additive in a mixture of equal amounts of tetrahydrofuran and dioxane and 2,000 parts of the mixture of tetrahydrofuran and dioxane were introduced and milling was continued for a further 3 hours.

The dispersion was then removed from the mill and divided. One part was used for measuring the dispersion stability and the second and larger part for coating.

The dispersion stability was measured as follows: Glass bottles having a capacity of 100, 150 or 250 ml were filled about ⅔ with the dispersion to be investigated and the bottles were closed and then placed on a roller stand. After one or 24 hours, the bottles were opened and in each case a coating was applied with a manual knife coater to a very smooth, 75 $\mu$m thick polyethylene terephthalate film having an average peak-to-valley height of from 40 to 50 nm. The gloss values of these were determined with the aid of a gloss meter and were compared with the values of the freshly prepared dispersion, of which a coating is likewise produced manually prior to storage on the roller stand. In the case of stable dispersions, little or no differences were found compared with the initial value, whereas unstable dispersions showed considerable differences in some cases.

The test provides information about whether a dispersion remains homogeneous during processing, for example during stirring and filtration, or becomes homogeneous due to flocculation and reagglomeration, with all the resulting disadvantages for the magnetic layer.

The results of the stability test are shown in Table 1.

The second part of the dispersion was further processed as follows: The dispersion is filtered, provided, while stirring, with 36 parts, based on 1,000 parts of dispersion, of a 50% strength solution of a triisocyanate obtained from 3 mol of toluylene diisocyanate and 1 mol of trimethylolpropane, and immediately thereafter applied by means of an engraved roller to a 15 $\mu$m polyethylene terephthalate film. The side opposite the backing coating was provided with a video magnetic layer in the same operation. The film coated on both sides was dried in a heat tunnel at from 50 to 100° C. and calendered by being passed between heated rollers under pressure. The layer thicknesses were 0.4 $\mu$m for the backing coating and 2.2 $\mu$m for the magnetic layer. The film webs subsequently slit into ½" wide tapes were tested by various methods to determine the stability under conditions of high temperature and humidity: Method 1 according to MIL-T-21029A under the following conditions:

A 90 cm long piece of tape was wound under a tension of 9.81 N, produced by a suspended weight, onto a hub having a diameter of 12.7 mm, and the end of the tape was fastened by means of a narrow adhesive tape coated on both sides. The roll prepared in this manner was subjected to a heat/moisture cycle.

Cycle:
from 16 to 18 hours at 54.5° C. and 85±5% relative humidity and 4 hours at 54.5° C. and 5% relative humidity, followed by storage at room temperature.

b) More severe form, as for a) but at 76° C.

The tape is stable under conditions of high temperature and humidity if, after the adhesive tape has been removed, the first tape layers become detached independently. In the case of tapes which are not stable under conditions of high temperature and humidity, the backing coating is observed to stick to the magnetic layer.

The results are shown in Table 2.

Method 2:

For a ½" video tape, the number of errors were measured and noted 7 days after production, and the tape was then exposed to the following cycle for 7 days, after which measurements were carried out again:

12 hours at 5° C. and 80% relative humidity
12 hours at 50° C. and 80% relative humidity.

The results are shown in Table 3.

EXAMPLE 2

In this Example, the amount of the polyurethaneurea (meth)acrylate was doubled compared with Example 1, so that the amount in the binder matrix is 20%. Processing and testing were carried out as stated in Example 1. The results are shown in Tables 1, 2 and 3.

EXAMPLE 3

In this Example, the amount of polyurethaneurea (meth)acrylate in the binder matrix was increased to 30% compared with Example 1. Processing and testing were carried out as stated in Example 1. The results are likewise shown in Tables 1, 2 and 3.

EXAMPLE 4

In this Example, cubic zinc ferrite used in Examples 1 and 3 was replaced with an $\alpha$-$Al_2O_3$ having a mean particle size of from 0.1 to 0.2 $\mu$m. The binder system stated in Example 2 was used. The results are shown in Tables 1, 2 and 3.

EXAMPLE 5

In this Example, a polyurethaneurea resin according to European Patent 099,533 and a polyviny formal resin were used as binder components, in addition to the polyurethaneurea (meth)acrylate which was present in the binder matrix in a concentration of 20%. Instead of the pigments stated in Example 1, $Al_2O_3$ was used exclusively. The pigment volume concentration is 46%. Processing and testing were carried out as stated in Example 1. The results are likewise shown in Tables 1, 2 and 3.

COMPARATIVE EXAMPLE 12,500 parts of zirconium dioxide balls having a diameter of from 1.0 to 1.25 nun, 68.3 parts of a 15% strength solution of a polyurethane based on a polyester, a polyether and MDI having an average molecular weight of 70,000 and a phosphate content of 40 meq/kg of product and an adsorption of 0.08 mg/m$^2$, on a precipitated silica having a mean secondary particle size of 3 $\mu$m, in a mixture of 42.5 parts of tetrahydrofuran and 42.5 parts of dioxane, 80.7 parts of a 20% strength solution of a polyphenoxy resin, obtained from bisphenol A and epichlorohydrin and having 6% by weight of hydroxyl groups, in a mixture of 40 parts of tetrahydrofuran and 40 parts of dioxane, 124 parts of a 13% strength solution of a linear polyesterurethane resin, prepared from adipic acid, 1,4-butanediol and 4,4'-diisocyanatodiphenylmethane, in a mixture of 43.5 parts of tetrahydrofuran and 43.5 parts of dioxane, 3.4 parts of an isomeric $C_{18}$-carboxylic acid, 624 parts of a mixture of equal amounts of tetrahydrofuran and dioxane, 136.7 parts of the stated precipitated silica, 34.2 parts of a zubic zinc ferrite having a mean particle size of 0.12 $\mu$m and 8.5 parts of a polyolefin having an average molecular weight of 3,000 and a mean spherical particle diameter of 500 $\mu$m were introduced into a batchwise stirred ball mill having a volume of 10,000 parts. The stirred ball mill was then closed and the content was dispersed for 6 hours. Thereafter, the mill was opened, a further 68.3 parts of a 15% strength solution of the polyurethane described above, in a mixture of 42.5 parts of tetrahydrofuran and 42.5 parts of dioxane, 355 parts of a 20% strength solution of the polyphenoxy resin described above, in a mixture of 40 parts of tetrahydrofuran and 40 parts of dioxane, 14.87 parts of a 10% strength solution of dibutyltin dilaurate in a mixture of 45 parts of tetrahydrofuran and 45 parts of dioxane, 6.9 parts of a 10% strength solution of a fluorine additive in a mixture of 45 parts of tetrahydrofuran and 45 parts of dioxane, 428 parts of a 13% strength solution of the linear polyesterurethane resin described above, in a mixture of 43.5 parts of tetrahydrofuran and 43.5 parts of dioxane, and 2,095 parts of a mixture of equal amounts of tetrahydrofuran and dioxane were introduced and milling was continued for a further 3 hours. The dispersion was further processed and tested as stated in Example 1, except that 38 parts of the 50% strength solution of the isocyanate resin were added per 1,000 parts of the dispersion.

The results are shown in Tables 1, 2 and 3.

COMPARATIVE EXAMPLE 2

In this Comparative Example, the precipitated silica as stated in Comparative Example 1 was replaced with pyrogenic silica treated with a trialkoxysilane. The other parameters remained unchanged. The results are shown in Tables 1, 2 and 3.

COMPARATIVE EXAMPLE 3

A conventional polyesterurethane which exhibited no adsorption onto the surface of the precipitated silica was used for the comparative experiment.

3,325 parts of zirconium dioxide spheres having a diameter of from 1.0 to 1.25 nun, 136 parts of a precipitated silica having a mean agglomerate size of 3 $\mu$m, 34 parts of cubic zinc ferrite having a mean particle size of 0.12 $\mu$m, 8.5 parts of a polyolefin having an average molecular weight of 3,000 and a mean spherical particle diameter of 500 $\mu$m, 107.5 parts of a 20% strength solution of a vinyl chloride copolymer, having an average molecular weight of 35,000 and a hydroxyl content of 1.8% by weight, in a mixture of 40 parts of tetrahydrofuran and 40 parts of dioxane, 160 parts of a 13% strength solution of a linear polyesterurethane resin, prepared from adipic acid, 1,4-butanediol and 4,4'-diisocyanatodiphenylmethane, in a mixture of 43.5 parts of tetrahydrofuran and 43.5 parts of dioxane, 2.5 parts of an isomeric $C_{18}$-carboxylic acid, and 810 parts of a mixture of equal amounts of tetrahydrofuran and dioxane were introduced into a batchwise stirred ball mill having a volume of 10,000 parts. The stirred ball mill was then closed and the content was dispersed for 6 hours. Thereafer, the mill was opened and a further 14.8 parts of a 10% strength solution of dibutyltin dilaurate in a mixture of 45 parts of tetrahydorfuran and 45 parts of dioxane, 6 parts of a 10% strength solution of a fluorine additive in a mixture of 45 parts of tetrahydrofuran and 45 parts of dioxane, 740 parts of a 13% strength solution of the linear polyesterurethane resin described above, in a mixture of 43.5 parts of tetrahydorfuran and 43.5 parts of dioxane, 433 parts of a 20% strength solution of vinyl copolymer described above, in a mixture of 40 parts of tetrahydrofuran and 40 parts of dioxane, and 1,725 parts of a mixture of equal amounts of tetrahydrofuran and dioxane were introduced and milling was continued for a further 3 hours. The dispersion was further processed and tested as stated in Example 1, except that 32 parts of the 50% strength solution of the isocyanate resin were added to 1,000 parts of the dispersion.

The results are shown in Tables 1, 2 and 3.

TABLE 1

Testing of the dispersion stability - gloss

|  | Example | | | | | Comp. | | |
|---|---|---|---|---|---|---|---|---|
|  | 1 | 2 | 3 | 4 | 5 | 1 | 2 | 3 |
| Gloss (60°) | | | | | | | | |
| Initial value | 56 | 61 | 63 | 52 | 40 | 51 | 55 | 58 |
| After 1 h on roller stand | 62 | 59 | 62 | 53 | 40 | 51 | 54 | 51 |
| After 24 h on roller stand | 54 | 60 | 64 | 52 | 41 | 51 | 55 | 8 |

TABLE 2

Testing of stability under conditions of high temperature and humidity MIL-T-21029A/Method 1

|  | Example | | | | | Comp. | | |
|---|---|---|---|---|---|---|---|---|
|  | 1 | 2 | 3 | 4 | 5 | 1 | 2 | 3 |
| a) | sat. | sat. | sat. | sat. | sat. | sat. | sat. | sat. |
| b) | sat. | sat. | sat. | sat. | sat. | st. | st. | st. | sat. = satisfactory
st. = sticks

TABLE 3

Storage test/7 days (errors)-Method 2

|  | Example | | | | | Comp. | | |
|---|---|---|---|---|---|---|---|---|
|  | 1 | 2 | 3 | 4 | 5 | 1 | 2 | 3 |
| Errors before storage | 6 | 5 | 7 | 4 | 4 | 4 | 3 | 25 |
| Errors after storage | 7 | 5 | 6 | 5 | 4 | 10 | 9 | 30 |

We claim:

1. A process for the production a magnetic recording medium, consisting of a nonmagnetic flexible substrate having a magnetic layer applied to one side of the substrate and consisting of magnetic material finely divided in an organic binder, and a backing coating present on that side of the substrate which is opposite the magnetic layer and consisting of nonmagnetizable solids finely distributed in a binder, wherein the binder matrix of the backing coating contains, in addition to conventional polymers, polyurethaneurea (meth)acrylate which is obtained by reacting a poly(meth)acrylate having up to 2 terminal OH groups per mol and a molecular weight of from 200 to 50,000 with a mixture of aliphatic polyisocyanates having an average functionality of from 3.0 to 6 NCO groups per mol, consisting of from 0.1 to 10% by weight of a diisocyanate,
from 20 to 80% by weight of a triisocyanate and
from 20 to 60% by weight of an isocyanate having a functionality of from 4 to 10, with the proviso that from 1.2 to 3.0 NCO groups react per OH group and the remaining OH groups are converted substituted urea groups with aminoalkyltrialkoxysilanes.

2. A process as claimed in claim 1, wherein the mixture of aliphatic polyisocyanates has an average functionality of from 3.5 to 5.0 NCO groups per mol, with the proviso that from 1.5 to 2.5 NCO groups react per OH group.

3. A process as claimed in claim 1, wherein the amount of the polyurethaneurea (meth)-acrylate in the binder matrixis from 5 to 55% by weight.

4. A process as claimed in claim 1, wherein the binder matrix is crosslinked with a polyisocyanate resin.

5. A process as claimed in claim 1, wherein the nonmagnetizable solids are silica products, zinc ferrite, $Al_2O_3$, $BaSO_4$, carbon black and mixtures thereof.

* * * * *